United States Patent
Mayer et al.

(10) Patent No.: US 7,861,600 B2
(45) Date of Patent: Jan. 4, 2011

(54) APPARATUS FOR ASCERTAINING AND/OR MONITORING FILL LEVEL AND/OR FLOW OF A MEDIUM

(75) Inventors: Winfried Mayer, Buch (DE); Michael Mirbach, Meckenbeuren (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 0 days.

(21) Appl. No.: 12/458,984

(22) Filed: Jul. 29, 2009

(65) Prior Publication Data

US 2010/0031753 A1    Feb. 11, 2010

(30) Foreign Application Priority Data

Aug. 8, 2008    (DE) .................. 10 2008 036 963

(51) Int. Cl.
*G01F 1/00* (2006.01)
*G01F 23/00* (2006.01)

(52) U.S. Cl. .................. 73/861; 73/290 R
(58) Field of Classification Search .......... 73/861, 73/290 R; 342/26 R
See application file for complete search history.

(56) References Cited

U.S. PATENT DOCUMENTS 7,688,249 B2 * 3/2010 Fischer et al. ............ 342/26 R
2008/0236275 A1 * 10/2008 Breed et al. ............... 73/290 V

* cited by examiner

*Primary Examiner*—Jewel Thompson
(74) *Attorney, Agent, or Firm*—Bacon & Thomas, PLLC

(57) ABSTRACT

An apparatus for ascertaining and/or monitoring fill level and/or flow of a medium in a containment, including: at least one antenna, which radiates and/or receives high frequency signals according to a predetermined radiation characteristic along a main radiating axis in the direction of the surface of the medium; a control/evaluation unit, which evaluates the reflected high frequency signals and determines fill level on the basis of the travel time of the high frequency signals and/or flow on the basis of a Doppler frequency of the reflected high frequency signals; and at least one lens located between the antenna and the medium and having a first focal length in the direction of the antenna and a second focal length in the direction of the medium. A first focal point of the first focal length of the lens is so selected that the emitted high frequency signals of the antenna hit the lens within the lens aperture and that a second focal point of the second focal length lies in an opening region of the containment having an opening diameter that is smaller than the diameter of the lens aperture.

11 Claims, 3 Drawing Sheets

APPARATUS FOR ASCERTAINING AND/OR MONITORING FILL LEVEL AND/OR FLOW OF A MEDIUM

TECHNICAL FIELD

The present invention relates to an apparatus for ascertaining and/or monitoring fill level and/or flow of a medium in a containment. The apparatus includes: at least one antenna, which radiates and/or receives high frequency signals according to a predetermined radiation characteristic along a main radiating axis in the direction of the surface of the medium; a control/evaluation unit, which evaluates the reflected high frequency signals and determines fill level, on the basis of travel time of the high frequency signals, and/or flow, on the basis of a Doppler frequency of the reflected high frequency signals; and at least one lens located between the antenna and the medium and having a first focal length in the direction of the antenna and a second focal length in the direction of the medium.

BACKGROUND DISCUSSION

One measuring principle, among a number of contactless measuring methods for ascertaining fill level in a containment, is the travel time measuring method. In the case of the travel time measuring method, for example, microwaves, or radar waves, as the case may be, are emitted via an antenna apparatus, and the radar echo waves reflected on the surface of the medium are received back following a distance dependent travel time of the measuring signals. From half the travel time, the fill level of the medium in a container can be calculated. The echo curve represents, in such case, the received signal amplitudes as a function of time, wherein each measured value of the echo curve corresponds to the amplitude of an echo signal reflected on a surface at a certain distance. The travel time measuring method is divided essentially into two ascertainment methods. The time difference measurement is a first ascertainment method, which ascertains the time, which a broadband wave signal pulse requires for a traveled path, and another widely used ascertainment method is the determining of frequency difference between an emitted, frequency modulated, high frequency signal and the reflected, received, frequency modulated, high frequency signal (FMCW—Frequency Modulated Continuous Wave). In the following, no limitation is made to a particular ascertainment method. Fill level measuring devices working according to this measuring principle are available from the Endress+ Hauser under the mark MICROPILOT.

Used for some time in process measurements technology for radiating and receiving microwaves are, among others, group radiator antennas, planar antennas, antenna arrays, horn antennas or parabolic antennas. All these antennas for contactless measurement of fill level have, due to their construction, a certain spatial size and also a, most often, divergent radiation characteristic of the microwave signals, so that measurement in small openings in containments is difficult or, most often, even impossible.

If the antennas are used in a frequency range of above 20 GHz, then dielectric lenses could be used for focusing the electromagnetic waves, or for changing the radiation characteristics of the antenna. Dielectric lenses in small arrangements essentially follow the laws of optics. Thus, with a dielectric lens, the radiation profile of the antenna can be matched to the measurement conditions in the process. Such dielectric lens structures are shown, for example, in German Patent DE 44 12 770 A1 and European Patent EP 0 773 598 A2, and are applied in distance warning devices for motor vehicles.

SUMMARY OF THE INVENTION

An object of the invention is to provide a simple and cost-effectively manufacturable apparatus for determining and/or monitoring fill level and/or flow of a medium in a containment enabling reliable ascertainment of fill level and/or flow of a medium, when the medium is accessible through small openings in the containment and/or is located in small containments.

The object is achieved according to one embodiment of the invention by the features that a first focal point of the first focal length of a lens is so selected that the emitted high frequency signals of the antenna hit the lens within the lens aperture and that a second focal point of the second focal length lies in an opening region of the containment having an opening diameter which is smaller than the diameter of the lens aperture.

In an especially preferred form of embodiment of the invention, it is provided that the containment is embodied as a bottle-like container having an opening in a neck region narrowed to a diameter and the second focal point of the second focal length of the lens of the emitted high frequency signals reflected on the surface of the medium lies in this narrowed opening region.

In an advantageous form of embodiment of the solution of the invention, it is provided that the containment is embodied as a channel having the diameter in the opening region in which the second focal point of the second focal length of the emitted high frequency signals reflected on the surface of the medium lies.

A purpose-supporting embodiment of the apparatus of the invention includes the features that the main radiation axis of the antenna is arranged offset from the optical axis of the lens, so that the high frequency signals do not hit perpendicularly on the surface of the medium and the control/evaluation unit ascertains the velocity of flow of the medium on the basis of the frequency obtained through the Doppler effect due to diffuse reflection of the high frequency signals on the surface of the medium.

In an embodiment of the apparatus of the invention, it is provided that a first antenna and at least a second antenna are provided, whose main radiation axes are arranged at a skewed angle relative to one another and/or with a different offset of the two main radiation axes of the two antennas relative to the optical axis of the lens, and the control/evaluation unit ascertains a unequivocal velocity of the flow of the medium by an averaging of the two frequencies obtained through the Doppler effect.

An advantageous embodiment of the solution of the invention provides that the second focal length lies in the order of magnitude of the first focal length of the lens.

An especially advantageous further development of the solution of the invention provides that the lens is a biconvex lens of a dielectric material, especially polytetrafluoroethylene.

In a useful embodiment of the apparatus of the invention, a cylindrical dielectric lens of a dielectric material is provided.

A suitable embodiment of the apparatus of the invention provides that the biconvex lens is made of a dielectric material blocking heat radiation or is coated by such a material blocking heat radiation and/or that the surfaces of the lens are formed by a structuring or a coating with an antireflection layer.

In an advantageous form of embodiment of the invention, it is provided that a bistatic arrangement of the first antenna and the second antenna is so embodied that the main radiation directions meet at a location on the surface of the medium and thus the radiated surfaces overlap with the focal point.

In a further form of embodiment of the invention, as an aid for the directing of the main radiation directions of the antennas relative to the optical axis of the lens, a marking of the focal points on the surface of the medium by means of on optically visible light point is provided.

BRIEF DESCRIPTION OF THE DRAWINGS

In view of the above detailed features, this invention provides the following advantages and characteristics, wherein, through the embodiments of the apparatus according to the invention, ascertaining and monitoring of fill level and/or flow of a medium in a containment having a bottle neck, or a small opening, and in narrow channels are possible.

Further details, features and advantages of the subject matter of the invention will become apparent from the following description with associated drawings, in which preferred examples of embodiments of the invention are illustrated. In the examples of embodiments of the invention illustrated in the figures, in order not to clutter and for simplifying, elements equal in construction and/or in function are provided with equal reference characters. The figures of the drawing show as follows.

DETAILED DISCUSSION IN CONJUNCTION WITH THE DRAWINGS

Figure 1:
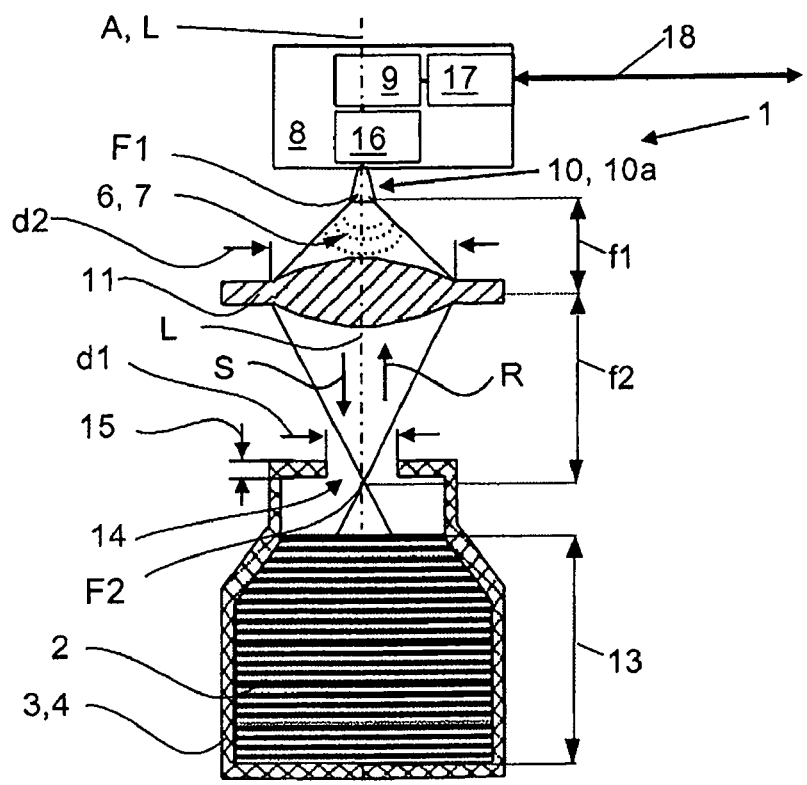
FIG. 1 is a schematic drawing of a first example of an embodiment for ascertaining fill level in containers with narrowed openings.

FIG. 1 shows a schematic representation of a first example of an embodiment for ascertaining the fill level 13 in a bottle-like container 4 having a narrowed opening.

Involved in the case of the illustrated apparatus 1 is a fill level measuring device 1, which includes: A transmitting/receiving element, or antenna, 10 freely radiating into the process space; a measurement transmitter 8; and a biconvex lens 11.

A biconvex lens 11 is applied in the apparatus 1 of the invention. However, all collecting lens, such as e.g. planoconvex lens, convex-concave lens, which collect a wave front 7 of high frequency signals 6 entering parallel to the optical axis L into a focal point F1, F2, are applicable in the apparatus 1 of the invention. Moreover, a semi cylindrically shaped, or cylindrically shaped, lens 11 has proved to be advantageous for measuring flow velocity in channels 5.

The measurement transmitter 8 includes: At least one transmitting/receiving unit 16, which provides for the production and receipt of the high frequency signals 6, such as e.g. microwave signals; a control/evaluation unit 9, which provides for signal processing of the high frequency signals and for open, or closed, loop control of the fill level measuring device 1; and a communication unit 17, which provides for communication over a fieldbus 18 and for energy, or power, supply of the fill level measuring device 1. Via the communication unit 17, the fill level measuring device 1 communicates, for example, with an external, servicing unit, other field devices and/or a control station. Alternatively or supplementally to a hardwired fieldbus 18, the fill level measuring device 1 can also communicate via a radio network interface, e.g. WLAN, with other field devices or the control station, as well as with a servicing unit.

Antenna 10 is embodied in the examples of embodiments, for example, as a horn antenna, via which a microwave signal 6 is radiated in the direction of the surface of the medium 2 with a predetermined radiation characteristic. Equally as well, the antenna 10 can be embodied in the form of any other known, freely radiating antenna, such as e.g. a parabolic antenna or a planar antenna. Regarding the microwave measuring method, for example, a high frequency microwave signal 6 is produced in the transmitting/receiving unit 16 as sent signal S and emitted or radiated via the antenna 10 with a predetermined radiation characteristic in the direction of medium 2. Following a travel time dependent on a traveled distance, the sent signals S, at least partially reflected on the surface of the medium 2, are received back by the antenna 10 and the transmitting/receiving unit 16 as reflection signal R. The control/evaluation unit 9 then ascertains from the reflection signal R an echo function, which represents the amplitude values of the echo signals of this reflection signal R as a function of the traveled distance or the corresponding travel time. By a filtering and analog/digital conversion, there is then derived from the analog echo function, or echo curve, a digitized, envelope curve. In the case of application of a microwave signal as sent signal S, the transmitting/receiving unit 16 includes: At least one high frequency module, which, for example, produces high frequency, pulse shaped, sent signals S in the gigahertz range, e.g. 26 GHz or 77 GHz; and a homodyne and/or heterodyne receiver, in the case of which the received reflection signals R are preprocessed and presented, time-expanded, in the form of an envelope curve.

The travel time measuring method can be divided into essentially two ascertainment methods. The first ascertainment method rests on a travel time measurement, which requires a pulse sequence modulated microwave signal 6 for the traveled path; a second widely used ascertainment method, the FMCW, or Frequency Modulated Continuous Wave method, rests on determining the frequency difference between the currently transmitted, continuously frequency modulated, sent signal S and the received reflection signal R of the high frequency signal 6. In the case of the FMCW method, most often a distinction is drawn between a ramp-shaped modulation and a stepped modulation of the frequencies. In general, in the following description, no limitation is made to any particular ascertainment method.

At microwave signal 6 frequencies greater than 20 GHz, optical laws can be approximately applied, even in the case of small arrangements and thus small distances. A physical limit of the spatial resolution in a best possible, focused plane is a half wavelength of the microwave 6. With a biconvex, dielectric lens 11, therefore, the wave front radiated from an antenna, e.g. a horn antenna, a planar antenna, or a planar radiator, can be focused in a small focal point F1, F2, wherein the area of the focal point F1, F2 depends on the dimensions, or diameter, of the lens aperture d2 and dielectric lens 11 and the selected focal length f1, f2. In FIG. 1, the arrangement of the lens 11 in front of the antenna 10 is so selected, that the high frequency signals 6 of the antenna 10 emitted in a first focal point F1 of the first focal length f1 of the lens 11 hit the lens 11 completely within the lens aperture 12 and that they lie in a second focal point F2 of the second focal length f2 in an opening region 15 of the opening 14 of the bottle-like container 4 having an opening diameter d1. The opening diameter d1 of the opening 14 of the container 4 can, through the focusing of the high frequency signals 6 by the lens 11, be an order of magnitude smaller than the diameter of the lens aperture d2.

Figure 2:
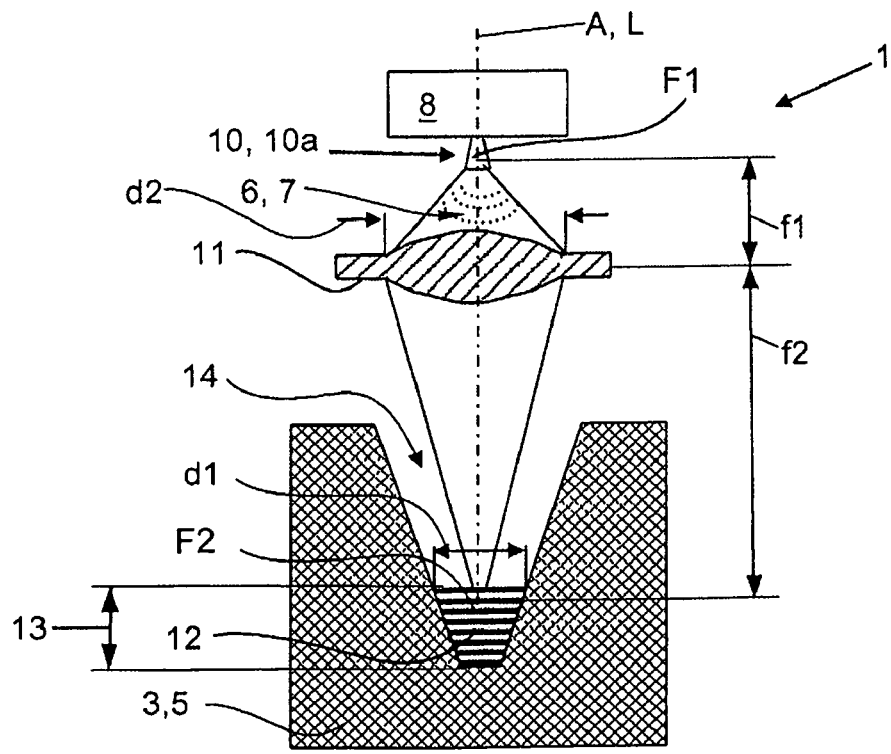
FIG. 2 is a schematic drawing of a second example of an embodiment for ascertaining fill level in a channel.

FIG. 2 shows a second example of an embodiment for ascertaining fill level 13 in a channel 5. Such narrow channels 5 are used, for example, in metal foundries. For thermal protection of the apparatus 1, or the lens 11, such is manufactured of a material blocking the thermal heat radiation or coated with such a material blocking the thermal heat radiation.

Moreover, for improving the transmission properties of the lens 11, a micro structuring or a coating with an antireflection layer is provided on the surfaces of the lens 11.

Figure 3:
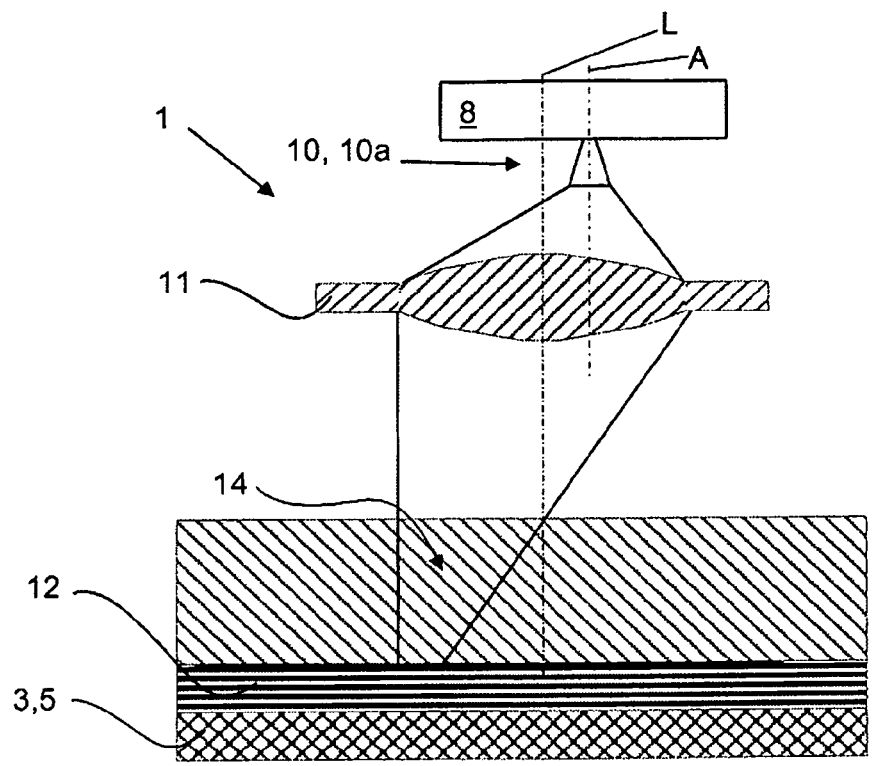
FIG. 3 is a schematic drawing of a third example of an embodiment for determining flow in a channel.

FIG. 3 shows a third example of an embodiment for determining flow in a channel. In this case, the main radiation axis A of the antenna 10 is arranged skewed or offset from the optical axis L of the lens 11. Through the offset of the main radiation axis A of the antenna 10 relative to the optical axis L of the lens 11, the electromagnetic waves 7 of the high frequency signals 6 hit the surface of the medium 2 at an angle predetermined by the offset. If the surface roughness of the medium 2 to be measured lies above a fourth of the wavelength of the applied high frequency signal 6, then a Lambert reflector with a diffuse reflection signal R is involved.

For ascertaining the flow 13 of a medium 2 in a channel 5, the electromagnetic wave 7 of the microwave signal is radiated as sent signal S at an angle onto the surface of the medium 2. The frequency of the diffusely back scattered reflection signal R caused by the surface roughness and/or other discontinuities in the medium is, taking into consideration the Doppler effect, proportional to the flow velocity of the medium 2 in the channel 5. This arrangement with only one antenna has, however, the disadvantage that, at slight tilting of the antenna 11, or the channel 5, or discontinuities in the medium 2 affect the measured value of flow velocity.

Figure 4:
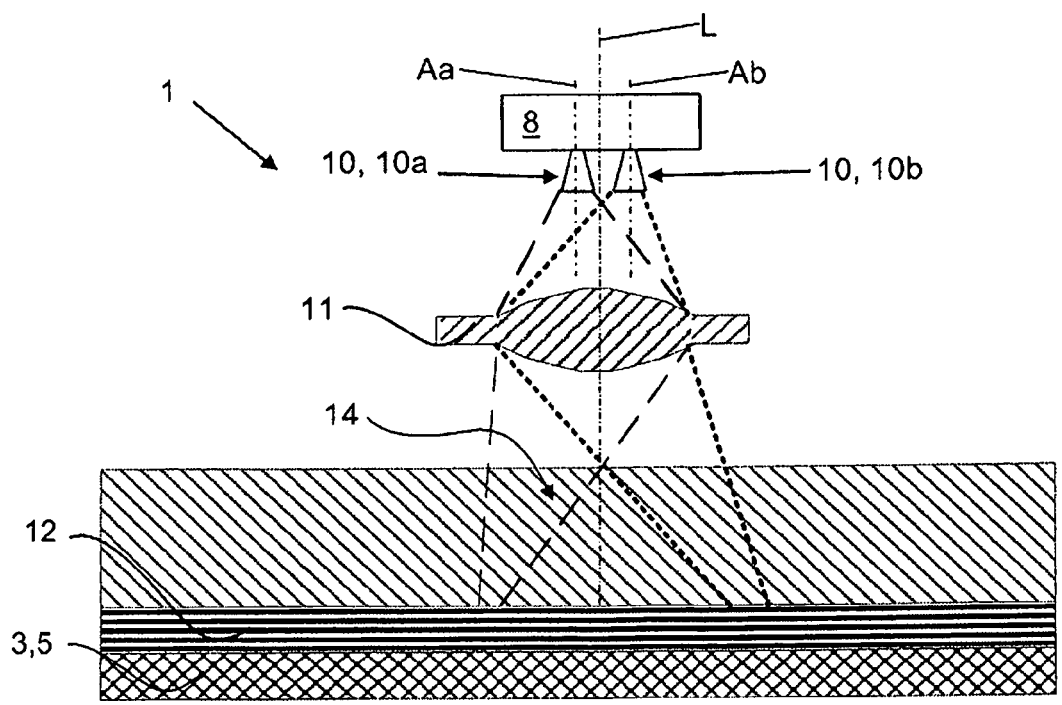
FIG. 4 is a schematic drawing of a fourth example of an embodiment for unequivocal determining of flow in a channel using two antennas in a Janus arrangement.

Therefore, in FIG. 4, a further example of an embodiment of the apparatus 1 of the invention is shown, which enables an unequivocal measurement of flow velocity of the medium 2 in channels 5. In this example of an embodiment, there are mounted above the lens 11a first antenna 10a and at least a second antenna 10b, whose main radiation axes (A) are arranged at a skew angle relative to one another and/or with a different offset of the two main radiation axes (As, Ab) of the two antennas (10a, 10b) relative to the optical axis (L) of the lens (11). Through the different angles with which the electromagnetic waves 7 of the high frequency signals 6 of the two offset antennas 10a, 10b hit the surface of the medium 2, different frequencies proportional to the flow velocities of the medium 2 in the channel 5 are ascertained for each antenna orientation. From these different Doppler frequencies, the control/evaluation unit ascertains by means of an average forming, thus, an unequivocal flow velocity of the flow 12 of the medium 2 in the channel 5, since changing measuring conditions, such as e.g. angle changes, act oppositely in the two ascertained Doppler frequencies of the antennas 10a, 10b. Such Janus arrangements of antennas for ascertaining velocities are known for vehicles from WO 1996/24071 A1 and DE 4021167.

Figure 5:
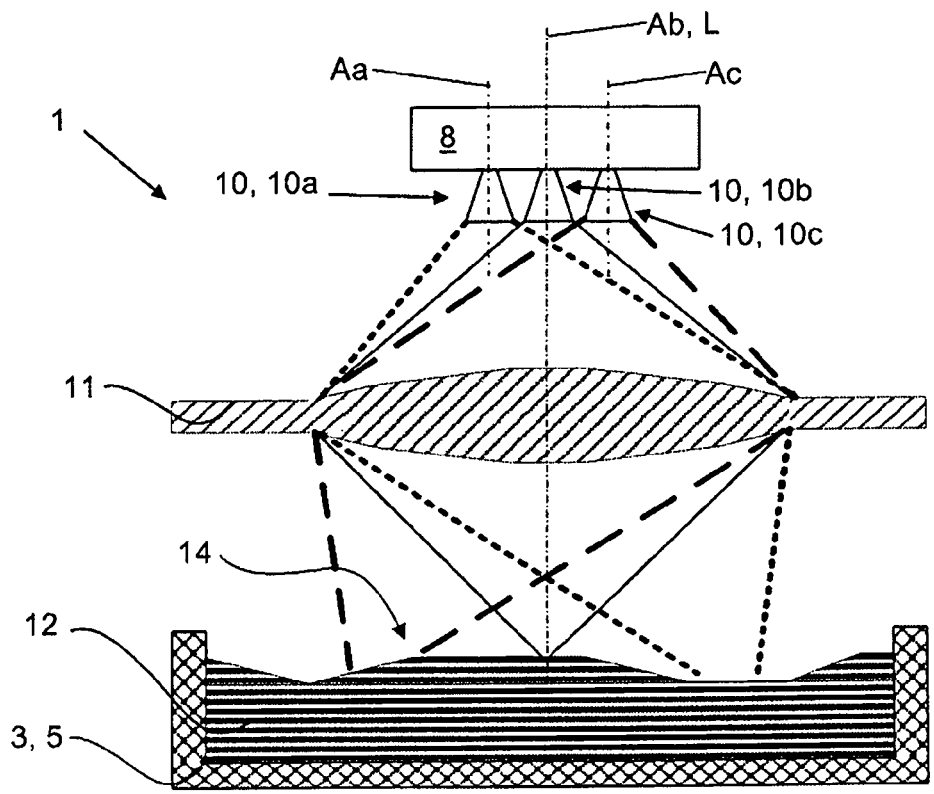
FIG. 5 is a schematic drawing of a fifth example of an embodiment for determining the surface profile of the medium in a channel or container.

FIG. 5 shows a supplementing, fifth example of an embodiment of the apparatus 1 of the invention. In this embodiment, the main radiation axes As, Ab, Ac of the three antennas 10a, 10b, 10c lying in a plane parallel to the lens 11 are arranged offset relative to the optical axis L of the lens 11, so that a plurality of focal points F1, F2, F3 are produced on the surface of the medium 2, or a plurality of radiation lobes of the electromagnetic waves 7 of the high frequency signal 6. Through the production of a plurality of focal points F1, F2, F3, or radiation lobes, it is possible to ascertain, at a plurality of locations on the surface of the medium 2, the fill level 13, or the roughness of the surface of the medium 2 in the channel 5 or on a conveyor belt.

Additionally, by this embodiment in the form of a multi lobe antenna, it is possible to distinguish between disturbance reflection signals of, for example, installed objects in the containers 4 and wanted reflection signals for ascertaining fill level 13 in the container 4 or a channel 5. For this, for example, a difference lobe method is applied, which determines from the ascertainment of the amplitude and phase differences of two or more antennas with different radiation characteristics the target angle of the reflector. Through these target angles, it is possible to distinguish between the disturbance echo signals of the installed objects, e.g. container wall, tubes, or stirring devices, and the wanted echo signal of the medium 2 in the containment 3. Such a difference lobe method for distinguishing between the disturbance echo signals and the wanted echo signals in the fill level measurement of a medium 2 in containers 4 is described, for example, in EP 01 143 724.

Figure 6:
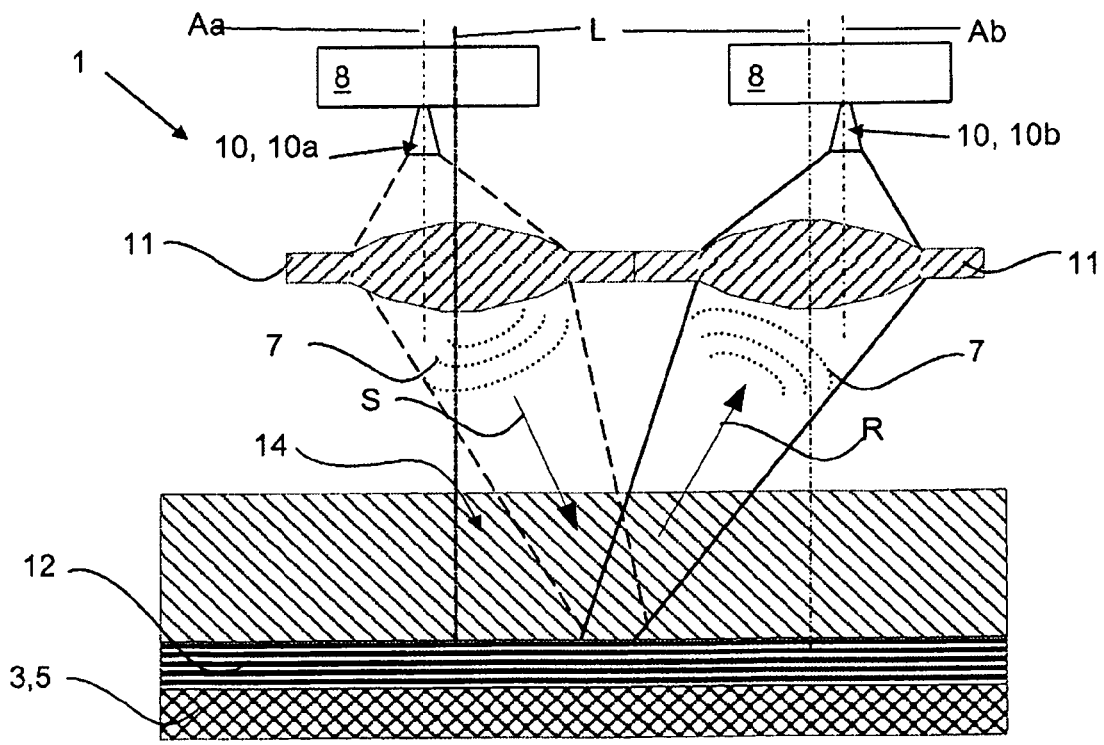
FIG. 6 is a schematic drawing of a sixth example of an embodiment for determining flow and/or fill level of a medium in a container or in a channel using a transmitting antenna and a receiving antenna.

FIG. 6 shows a schematic drawing of a sixth example of an embodiment for determining flow and/or fill level 13 of a medium 2 in a container 4 or a channel 5 using a bistatic arrangement of the first antenna 10a and the second antenna 10b, in the case of which the main radiation directions A meet in a location on the surface of the medium 2 and consequently radiated areas of the focal points F1, F2 overlap. By this embodiment of the arrangement of the two antennas 10a, 10b in front of the lens 11, the two lighted areas of the focal points F1, F2 on the surface of the medium 2 overlap. This arrangement has the advantage that, in the case of mirror reflecting and/or fluctuating surfaces, the fill level can still be ascertained. For this, the first antenna 10a, as transmitting antenna, emits the sent signal S in the direction of the medium 2 and the second antenna 10b, as receiving antenna, receives back the reflection signal R reflected on the surface of the medium 2.

These embodied types of the focusing lens 11 are adaptable also for the classic planar antennas, parabolic antennas, etc., even though such is not explicitly illustrated in this application.

Further advantages of the apparatus 1 of the invention are that
- monitoring of fill level 13 is possible in the case of mobile containers 4 having a bottle neck or a narrowed opening 14, whose fill level 13 must be checked before closure and which, for such purpose, are moved under the apparatus 1 on a conveyor belt,
- a continuous measuring and monitoring of fill level 13 is possible in narrow channels 5,
- an unequivocal flow measurement is possible in channels in the case of diffusely reflecting liquid surfaces by means of the Janus arrangement of two antennas 10, 10a, 10b above one of the lenses 11,
- a continuous measuring and monitoring of fill level 13 or flow 12 of hot melts of metals and/or glasses is possible in casting molds and casting channels, wherein, through the biconvex lens 11, despite a sufficient safety distance to the hot melts, a narrowly bounded measuring region in a narrow opening of the container 4 or a narrow channel 5, and a multipoint monitoring of viscously flowing media or media 2 in the nature of bulk goods in casting molds or monitoring of a conveyor belt load can be put into practice.

The invention claimed is:

1. An apparatus for ascertaining and/or monitoring fill level and/or flow of a medium in a containment, comprising:
    at least one antenna, which emits and/or receives high frequency signals with a predetermined radiation characteristic along a main radiation axis in the direction of the medium;
    a control/evaluation unit, which evaluates the reflected high frequency signals and determines fill level on the basis of the travel time of the high frequency signals and/or flow on the basis of a Doppler frequency of the reflected high frequency signals; and
    at least one lens provided between said at least one antenna and the medium and having a first focal length in the direction of said at least one antenna and a second focal length in the direction of the surface of the medium, wherein:
    a first focal point of said first focal length is so selected, that the emitted high frequency signals of said at least one antenna hits said at least one lens within a lens aperture; and
    a second focal point of said second focal length lies in an opening region of the containment having an opening diameter, which is smaller than the diameter of said lens aperture.

2. The apparatus as claimed in claim 1, wherein:
    the containment is embodied as a bottle-like container having an opening in its neck region narrowed to a diameter defining said opening diameter; and
    said second focal point of said second focal length of said at least one lens of the emitted high frequency signals reflected on the surface of the medium lies in this narrowed opening region.

3. The apparatus as claimed in claim 1, wherein:
    the containment is embodied as a channel having a diameter defining said opening diameter in the opening region, in which said second focal point of said second focal length of the emitted high frequency signals reflected on the surface of the medium lies.

4. The apparatus as claimed in claim 1, wherein:
    the main radiation axis of said at least one antenna is arranged offset relative to the optical axis of said at least one lens, so that the high frequency signals do not hit the surface of the medium perpendicularly and said control/evaluation unit ascertains the velocity of the flow of the medium on the basis of the frequency obtained by the Doppler effect due to the diffuse reflection of the high frequency signals on the surface of the medium.

5. The apparatus as claimed in claim 1, wherein:
    said at least one antenna comprises a first antenna and at least a second antenna, whose main radiation axes are arranged at a skew angle relative to one another and/or with a different offset of the two main radiation axes of said first and said second antennas relative to the optical axis of said at least one lens; and
    said control/evaluation unit ascertains consequently an unequivocal velocity of the flow of the medium from an averaging of the two frequencies obtained by the Doppler effect.

6. The apparatus as claimed in claim 1, wherein:
    said second focal length lies in the order of magnitude of said first focal length of said at least one lens.

7. The apparatus as claimed in claim 1, wherein:
    said at least one lens comprises a biconvex lens made of a dielectric material.

8. The apparatus as claimed in claim 1, wherein:
    said at least one lens comprises a cylindrical lens made of a dielectric material.

9. The apparatus as claimed in claim 7, wherein:
    said biconvex lens is made of a dielectric material blocking heat radiation or is coated with such a material blocking heat radiation and/or the surfaces of said biconvex lens is embodied by a structuring or a coating of an antireflection material.

10. The apparatus as claimed in claim 5, wherein:
    a bistatic arrangement of said first antenna and said second antenna is so embodied that the main radiation directions hit in a location on the surface of the medium and thus radiated areas of said first focal point and said second focal point overlap.

11. The apparatus as claimed in claim 1, wherein:
    as an aid for the directing of the main radiation directions of the antennas relative to the optical axis of said at least one lens, a marking of focal points on the surface of the medium is provided by means of an optically visible light point.

* * * * *